United States Patent
Wolf

(10) Patent No.: US 10,478,833 B2
(45) Date of Patent: Nov. 19, 2019

(54) FLUID TREATMENT SYSTEM, A FLUID PROCESSING APPARATUS AND METHOD OF TREATING A MIXTURE

(71) Applicant: National Oilwell Varco, L.P., Houston, TX (US)

(72) Inventor: Mark E. Wolf, Katy, TX (US)

(73) Assignee: National Oilwell Varco, L.P., Houston, TX (US)

( * ) Notice: Subject to any disclaimer, the term of this patent is extended or adjusted under 35 U.S.C. 154(b) by 366 days.

(21) Appl. No.: 15/105,026

(22) PCT Filed: Dec. 3, 2014

(86) PCT No.: PCT/EP2014/076406
§ 371 (c)(1),
(2) Date: Jun. 16, 2016

(87) PCT Pub. No.: WO2015/090966
PCT Pub. Date: Jun. 25, 2015

(65) Prior Publication Data
US 2016/0361728 A1 Dec. 15, 2016

(30) Foreign Application Priority Data
Dec. 16, 2013 (EP) .................................... 13197554

(51) Int. Cl.
*B01D 17/02* (2006.01)
*B01D 17/12* (2006.01)
(Continued)

(52) U.S. Cl.
CPC .......... *B04C 11/00* (2013.01); *B01D 17/0208* (2013.01); *B01D 17/0217* (2013.01);
(Continued)

(58) Field of Classification Search
CPC .. B01D 21/0012; B01D 21/34; B01D 21/267; B01D 21/26; B01D 21/2411; B01D 29/336; B01D 29/48; B01D 29/606; B01D 29/66; B01D 29/908; B01D 2221/08; B01D 17/0217; B01D 17/02; B01D 17/12; B01D 17/0208; C02F 1/32; C02F 1/38; C02F 1/40; C02F 1/001; C02F 9/00; C02F 2103/008; C02F 2209/005; C02F 2303/16;
(Continued)

(56) References Cited

U.S. PATENT DOCUMENTS 5,366,641 A 11/1994 Hadfield et al.
5,507,995 A 4/1996 Webb
(Continued)

FOREIGN PATENT DOCUMENTS

WO  WO 91/00387  1/1991

OTHER PUBLICATIONS

PCT Written Opinion of the International Search Authority for counterpart application PCT/EP2014/076406 dated Dec. 16, 2013 (5 pgs).

(Continued)

*Primary Examiner* — Benjamin L Lebron
(74) *Attorney, Agent, or Firm* — Jonathan M. Pierce; Porter Hedges LLP

(57) ABSTRACT

A fluid treatment system, a fluid processing apparatus and a method of treating a mixture are provided in which a separator has two outlets for different components of mixed fluid.

12 Claims, 8 Drawing Sheets

Figure 1:
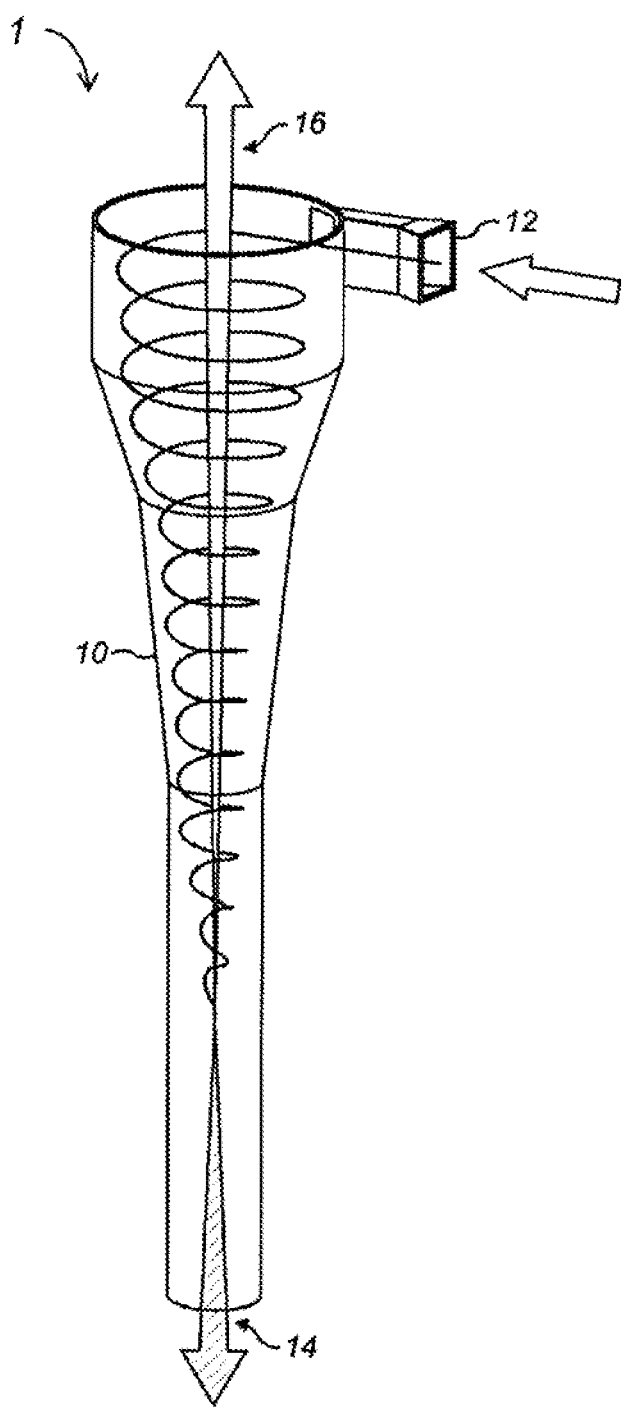

(51) Int. Cl.
| | |
|---|---|
| *B04C 5/23* | (2006.01) |
| *B04C 5/28* | (2006.01) |
| *B04C 5/30* | (2006.01) |
| *B04C 11/00* | (2006.01) |
| *C02F 1/38* | (2006.01) |
| *C02F 1/40* | (2006.01) |
| *C02F 1/32* | (2006.01) |
| *C02F 101/32* | (2006.01) |

(52) U.S. Cl.
CPC ............... *B01D 17/12* (2013.01); *B04C 5/23* (2013.01); *B04C 5/28* (2013.01); *B04C 5/30* (2013.01); *C02F 1/38* (2013.01); *C02F 1/40* (2013.01); *C02F 1/32* (2013.01); *C02F 2101/32* (2013.01)

(58) Field of Classification Search
CPC ......... C02F 2101/32; B04C 5/28; B04C 5/30; B04C 11/00; B04C 5/23; E21B 43/34; E02B 15/107
See application file for complete search history.

(56) References Cited

U.S. PATENT DOCUMENTS

| | | |
|---|---|---|
| 2005/0040091 A1 | 2/2005 | Nilsen et al. |
| 2013/0319952 A1 | 12/2013 | Wolf |

OTHER PUBLICATIONS

PCT International Search Report for counterpart application PCT/EP2014/076406 dated Dec. 16, 2013 (4 pgs).

FLUID TREATMENT SYSTEM, A FLUID PROCESSING APPARATUS AND METHOD OF TREATING A MIXTURE

This application is a U.S. national stage application under 35 U.S.C. § 371 of PCT Application No. PCT/EP2014/076406, filed on Dec. 3, 2014, which claims priority to international application EP 13197554.2, filed on Dec. 16, 2013, both of which are incorporated by reference herein for all purposes.

The present invention relates to an apparatus for separating a mixture of two fluid components. In particular, it relates to an apparatus with improved blockage detection, blockage clearing, and system control.

In oil production processes, a mixture of oil and water is often recovered. The mixture that is recovered in this way is unwanted and needs to be disposed of. However, it is not environmentally appropriate to dispose of water while it is still contaminated with oil. Therefore, there is a need to separate the oil from the water.

In practice, there are certain limitations on the apparatus that can be used for this separation. For onshore applications, large skim tanks in combination with flotation equipment have been used to remove oil from water. However, in certain urban oil production locations, the use of tanks and non-pressurized separation equipment is under scrutiny due to their emission of hazardous pollutants to the atmosphere as well as their large area footprint. In addition, the constraints of offshore oil production, such as the size of the offshore platform, require that the separation apparatus is both effective and compact. Over recent decades, cyclone separators have been developed to meet these requirements. Specifically, deoiling hydrocyclones for the removal of oil from water have become popular for offshore applications in the oil and gas industry.

A deoiling hydrocyclone separator operates by converting pressure energy into velocity as a fluid mixture of water and oil enters the hydrocyclone through a tangential inlet. This causes the fluid inside the hydrocyclone to spin, which creates a centrifugal force thousands of times higher than the force of gravity within the fluid. The centrifugal force multiplies the natural buoyancy of small oil droplets that have a relatively low density within the water, which has a relatively high density. Consequently, the heavier water phase is directed towards the edges of the hydrocyclone, while the lighter oil phase is retained at the center of the hydrocyclone. The two phases of oil and water can then be extracted from the hydrocyclone separately; the water is extracted via a clean water outlet while the oil is extracted via a waste reject line.

Compared with alternative separation devices, such as skim tanks, a hydrocyclone separator yields a much faster separation process within a smaller area because the active gravitational force in the skim tank is effectively replaced by centrifugal forces in the hydrocyclone, which are of a far higher magnitude. These high centrifugal forces also allow hydrocyclone separators to be relatively insensitive to motion and orientation, making them particularly ideal for offshore applications in the oil industry.

Nevertheless, there remain difficulties in implementing effective hydrocyclone separator systems at a reasonable cost with the required reliability. Existing deoiling hydrocyclone arrangements typically comprise a hydrocyclone separator that receives a mixture of water and oil from an upstream fluid store, and rejects the separated fluids via a clean water outlet and an oily waste outlet. For example, for reasons of size and efficiency such systems often comprise plural individual hydrocyclone separators operating in parallel and have relatively narrow outlet apertures. This can lead to individual separators in the array becoming blocked, particularly at their oily waste outlets. Such blockage results in reduced efficiency and quality of separation but is difficult to detect with current systems because the remaining separators in the array continue to operate. Conventionally this leads to an approach in which the system is taken off-line at predetermined intervals for cleaning. However this is inconvenient as the process requires manual operation and the interval has to be set for a worst case situation for safety and quality control reasons. This introduces logistical problems if the system is to be located in a remote area as it requires regular visits by an operator.

There is an ongoing desire to improve fluid separation apparatus for use in onshore and offshore oil operations and elsewhere. In particular, there is a desire to improve the operational efficiency of the hydrocyclone system and maintain a constant operation while simultaneously retaining reliability of the system and avoiding prohibitive expenses. There is also a desire to automate such system when possible to avoid manual intervention.

According to a first aspect of the present invention, there is provided a fluid treatment system for separating a mixture of a first fluid and a second fluid, comprising:

a separator comprising a separating chamber, an inlet for receiving the mixture, a first outlet for discharge of the first fluid from the separating chamber and a second outlet for discharge of the second fluid from the separating chamber;

an inlet pressure transmitter, a first outlet pressure transmitter, and a second outlet pressure transmitter for monitoring the pressure at the inlet, first outlet and second outlet respectively and providing a signal indicative of the pressures to a control device;

an inlet flow monitor for monitoring fluid flow at the inlet;

an outlet flow monitor for monitoring fluid flow at at least one of the first and the second outlets; and a control device for receiving signals from the pressure transmitters and flow monitors and for processing those signals to provide an indication of blockage within the separator.

The outlet flow monitor may be positioned solely on the first outlet.

The control device may use the signals from the pressure transmitters to produce a pressure differential ratio (PDR) as part of the determination of the presence of a blockage. The control device may use the signals from the flow monitors to produce a percentage reject flow value based upon the flow into the inlet and the flow through the outlet as part of the determination of the presence of a blockage. The control device may comprise reference data to which the PDR and percentage reject flows are compared to provide an indication of a blockage. Alternatively, or in addition thereto, the control device may comprise processing means for performing calculations on received flow and pressure data to provide a relationship between percentage reject flow and PDR to provide an indication of a blockage and/or the amount of blockage. The relationship may be based on a linear, quadratic, logarithmical or other mathematical function.

The control device may be configured to provide an alarm condition once a blockage has been detected and/or an amount of blockage has been detected.

The separator is preferably a cyclone separator, more preferably a hydrocyclone separator. Cyclone separators are particularly efficient and compact. The separator may comprise an array of individual separators arranged to operate in parallel.

In preferred embodiments, the first fluid has a greater density than the second fluid. Moreover, the first and second fluids may be liquids, and in particular the first fluid may be water while the second fluid may be oil.

According to the present invention, there is also provided a fluid processing apparatus comprising a fluid treatment system as described above, a control valve after the conduit, the control valve operating to control the flow of fluid leaving the fluid processing apparatus, and a fluid store, wherein the fluid treatment system receives fluid from the fluid store.

Preferably, the fluid store is an upstream pre-separator vessel, more preferably a free water knock out, skim tank, or other type of oil and water separator. In these vessels, a natural separation of fluids with different densities occurs over time. For example, a mixture of water and oil that is fed into the upstream fluid store may naturally separate into three components, with water at the bottom, oil at the top and a mixture of water and oil in the middle. In such a formation, it is possible to skim oil from the top of the fluids in the fluid store as a pre-separator separation treatment.

In a preferred fluid processing apparatus, the fluid processing apparatus further comprises a control valve after the conduit, which is automated to open and close in order to allow fluid to leave the fluid treatment system. Preferably, this control valve is coupled to the fluid store such that it is automated to control the interface between the oil and water phases in the upstream fluid store at a constant level. As the rate of fluid flow entering the upstream fluid store varies over time, the control valve is opened or closed in order to maintain the constant interface level.

In some arrangements, one or more additional fluid treatment elements may be introduced to the fluid treatment apparatus. For example, these additional treatment elements may comprise de-sanding cyclones and/or filters for the removal of solids, coalescers for the separation of emulsions, electro-coagulators for the removal of contaminants or ultraviolet and ultrasonic fluid disinfectants. The position of the additional fluid treatment elements within the fluid processing apparatus is dependent on its specific purpose.

According to the present invention, there is also provided a method of treating a mixture of a first fluid and a second fluid, comprising:
  receiving the mixture into an inlet of the separator;
  separating the mixture of the first fluid and the second fluid in the separator;
  discharging the first fluid through a first outlet of the separator;
  discharging the second fluid through a second outlet of the separator;
  monitoring the pressure in the inlet and first and second outlets of the separator;
  monitoring the fluid flow at the inlet and at least one of the first and second outlets of the separator; and
  providing an indication of the presence of a blockage in the separator depending upon the monitored pressures and flows.

With the present invention, through the simple monitoring of pressures and flows, it is possible to detect at early stage a blockage which may affect the efficiency of the separator and its associated system. Following on from that detection it is possible to raise an alarm for either manual intervention or to trigger an automated intervention to remove the blockage. Accordingly, it is possible to provide a system and method which operates far more efficiently and with a far more reliable separation level than is possible with prior art configurations.

Figure 2:
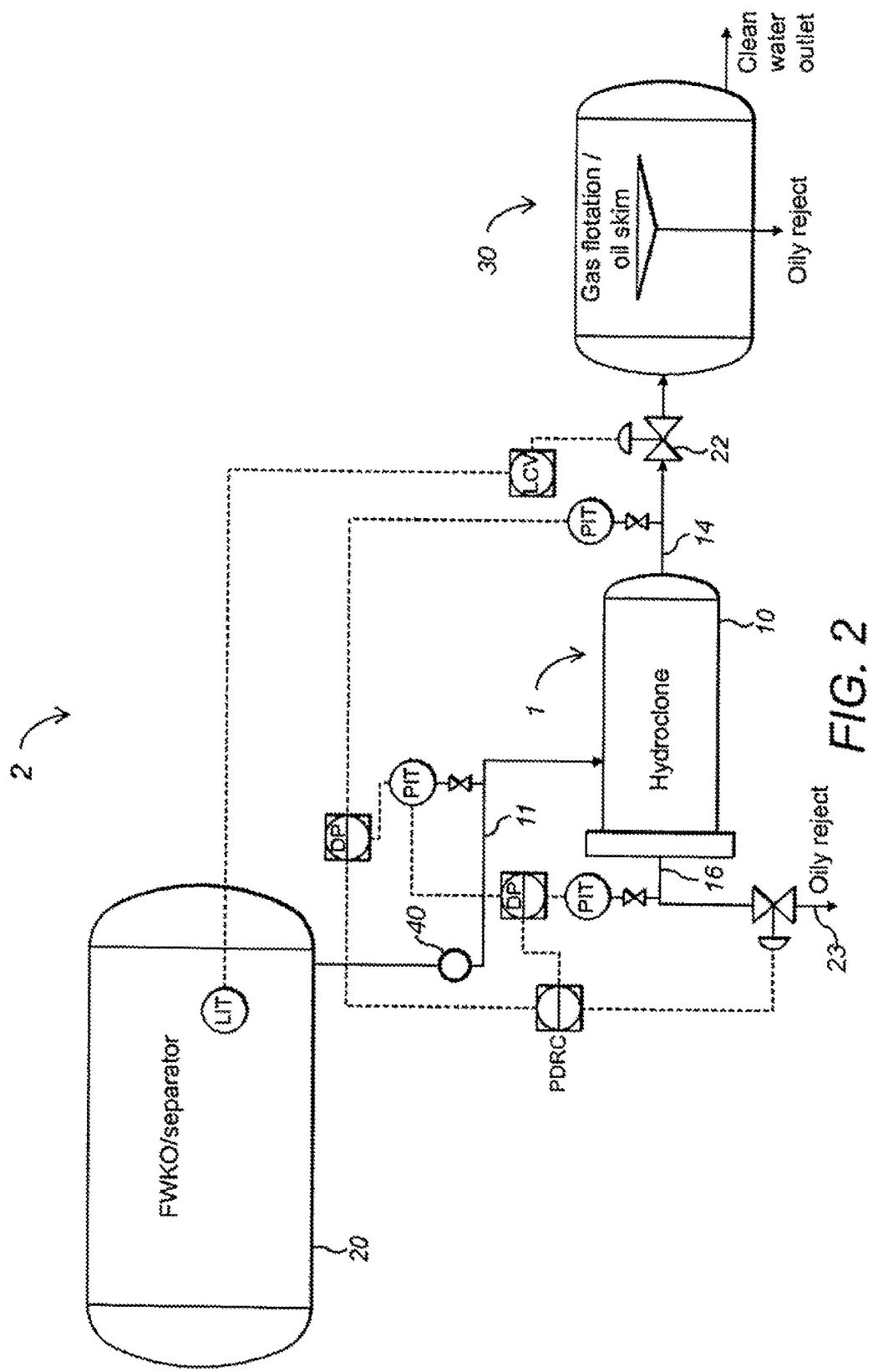
Figure 3A:
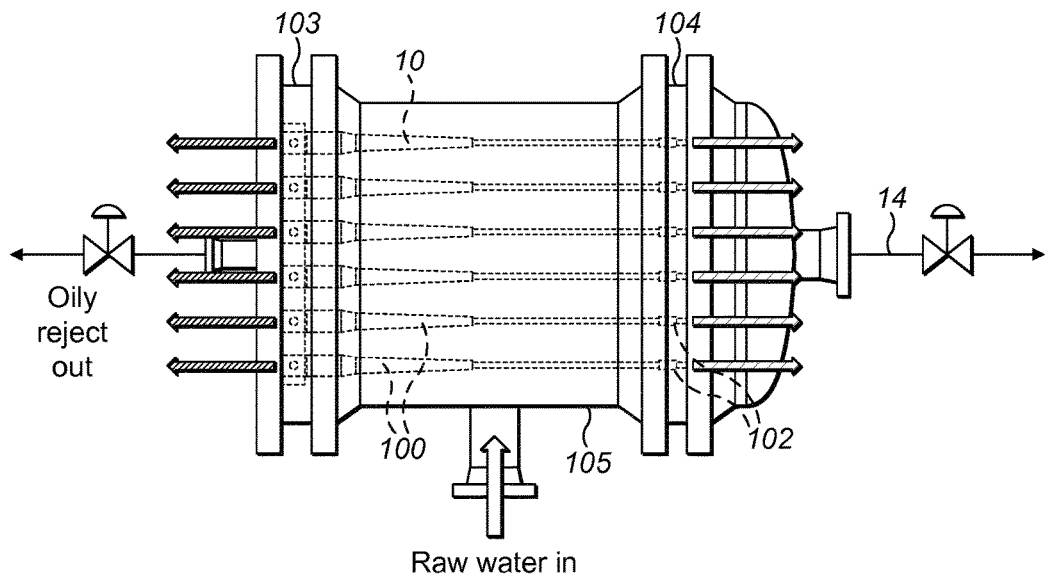
Figure 3B:
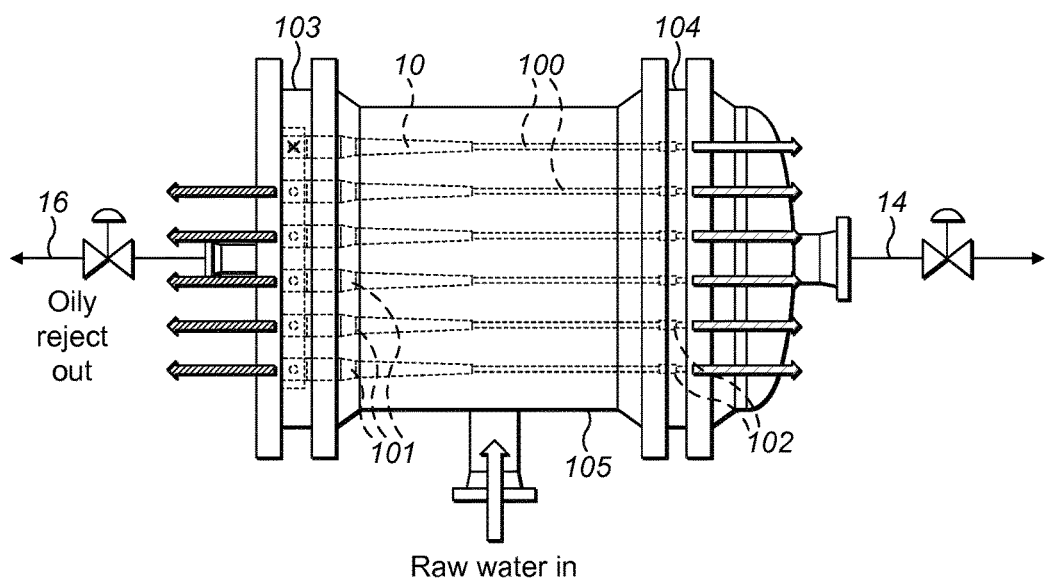
Figure 4:
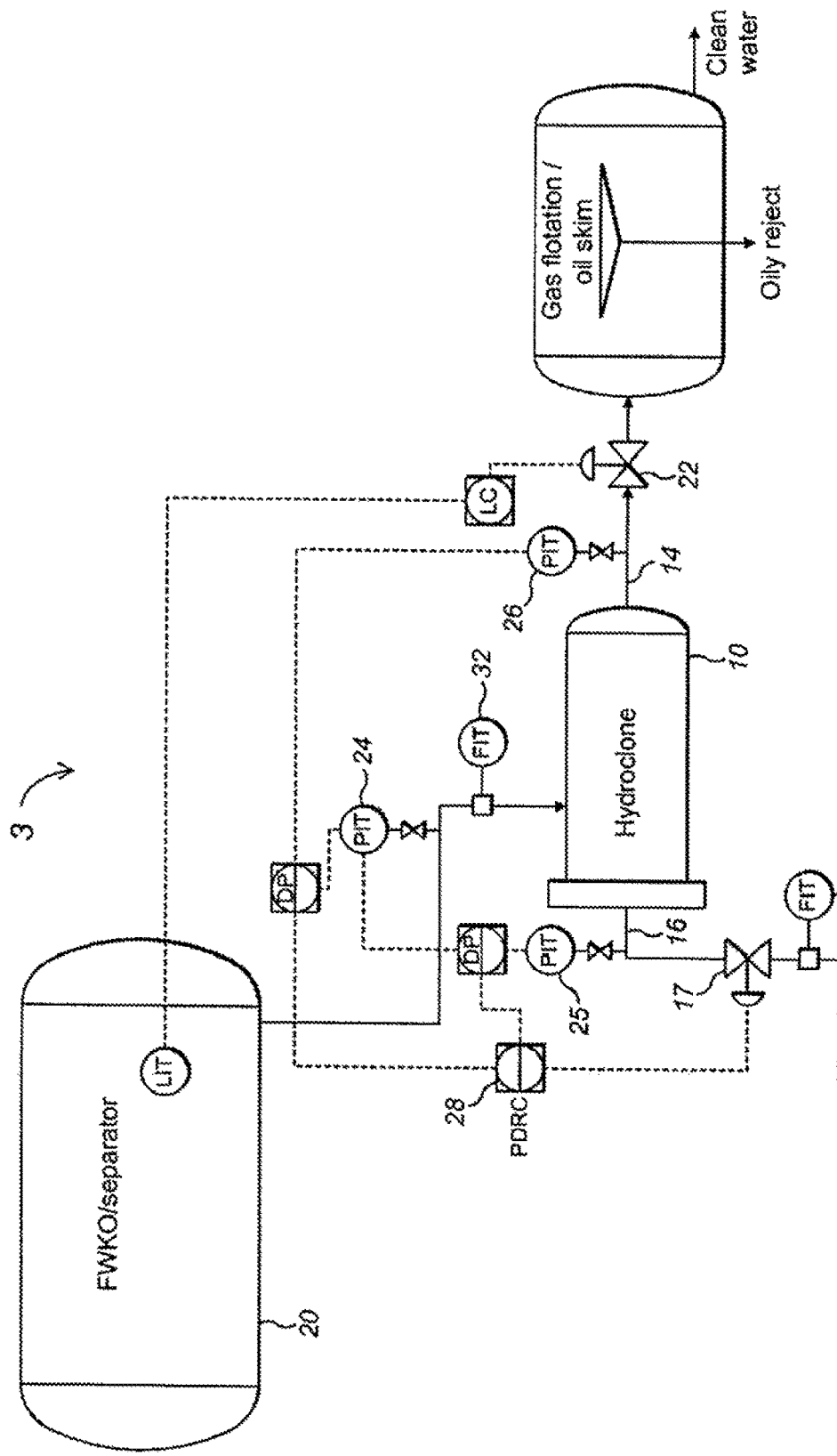
Figure 5:
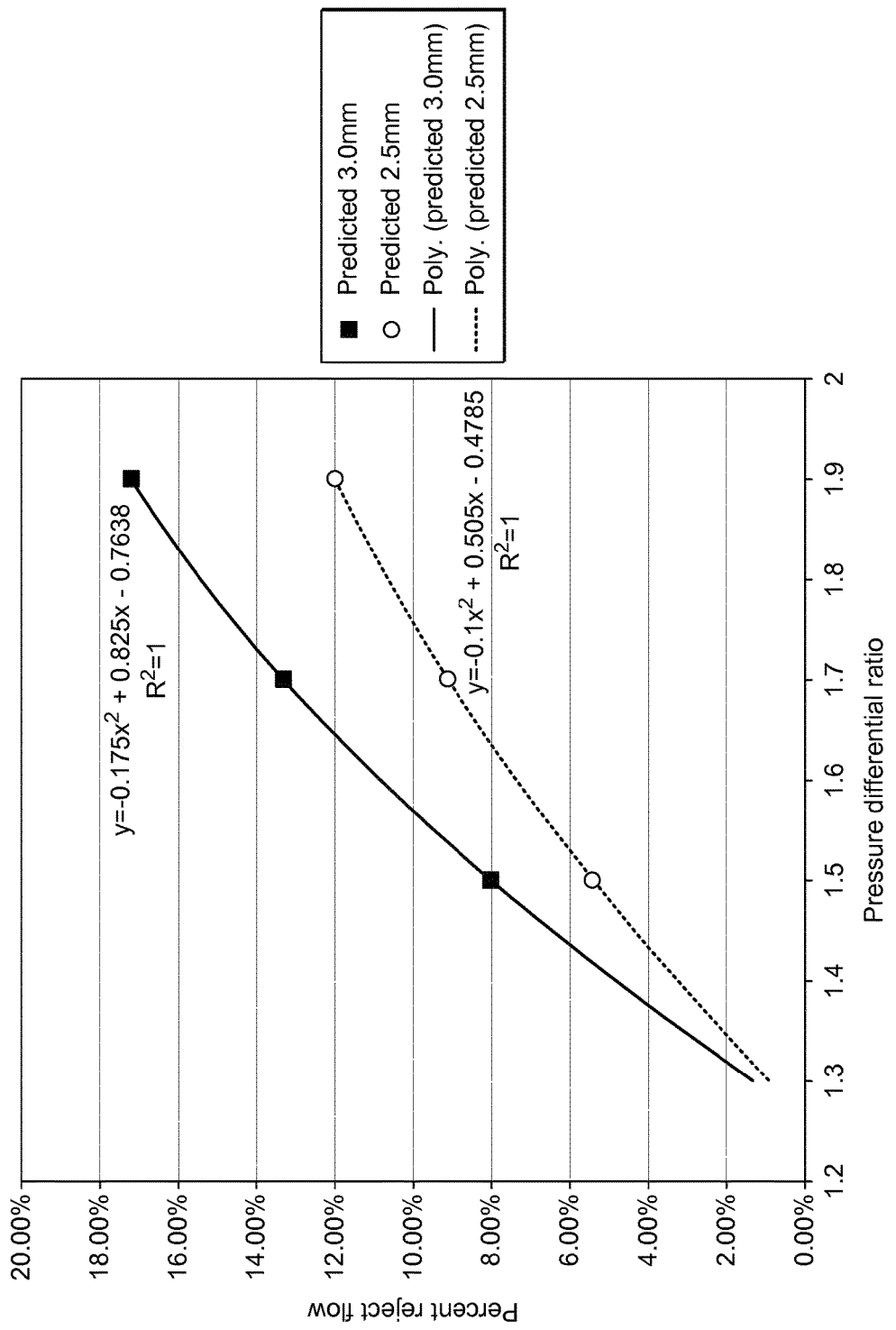
Figure 6:
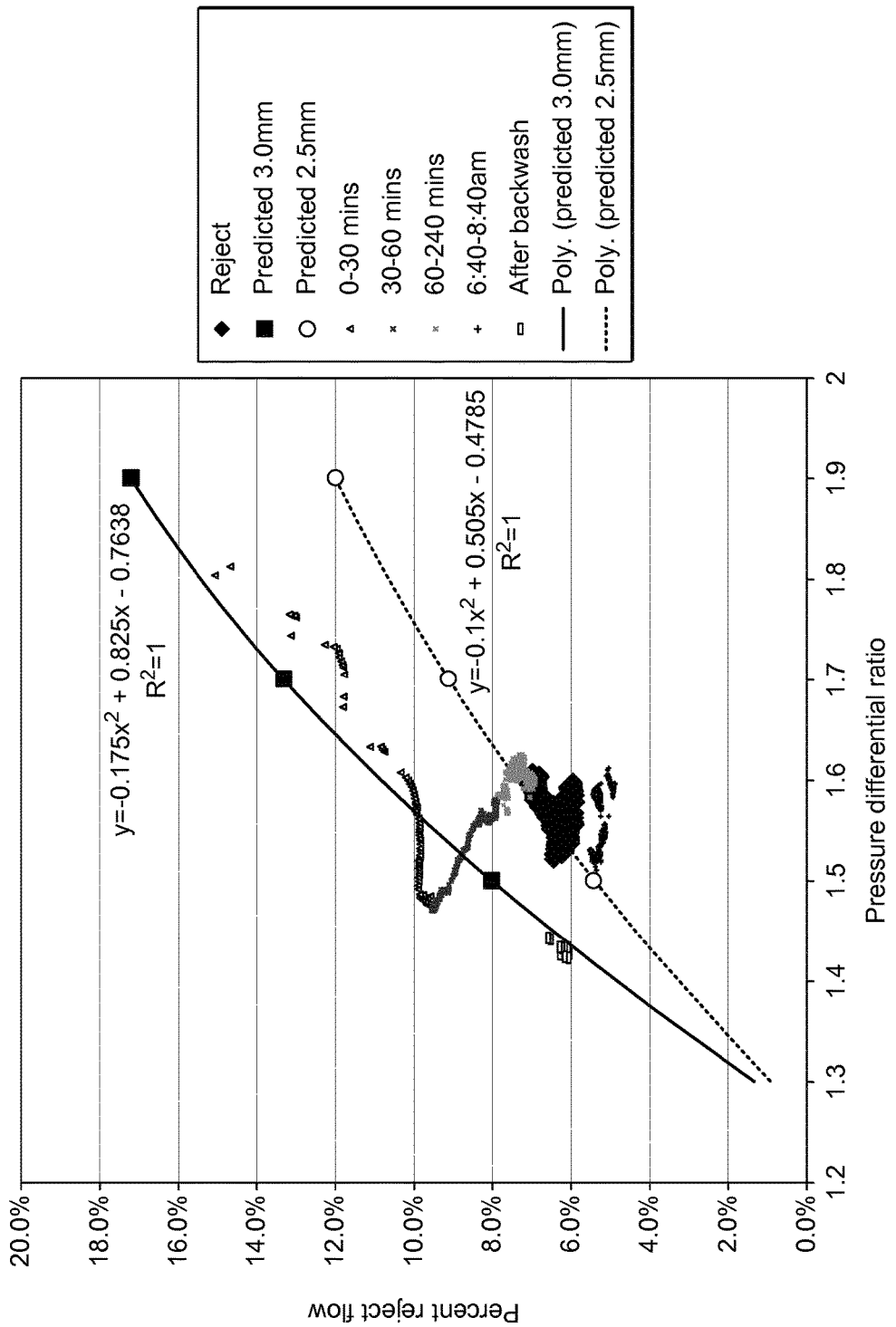
Figure 7:
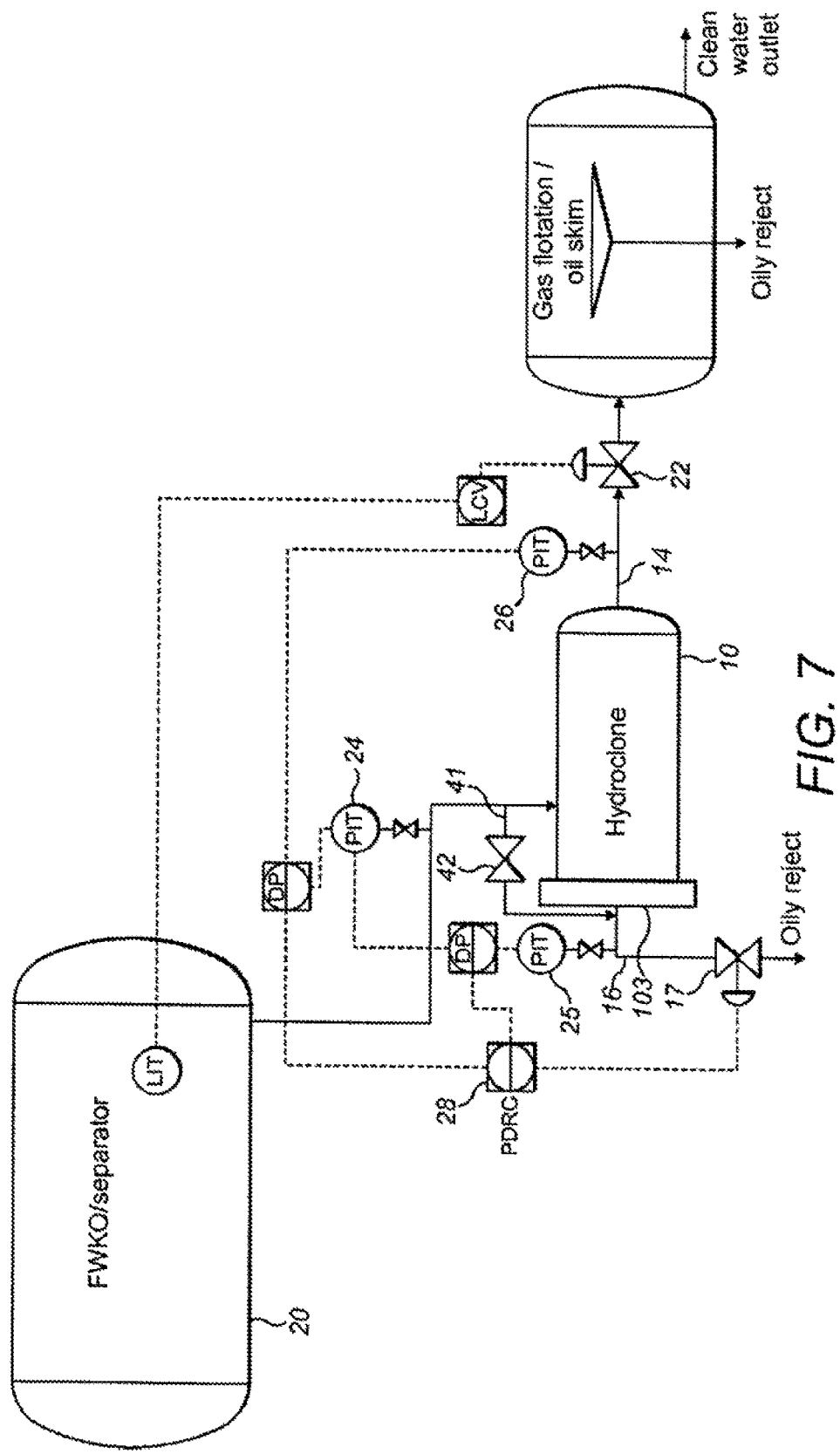
Figure 8:
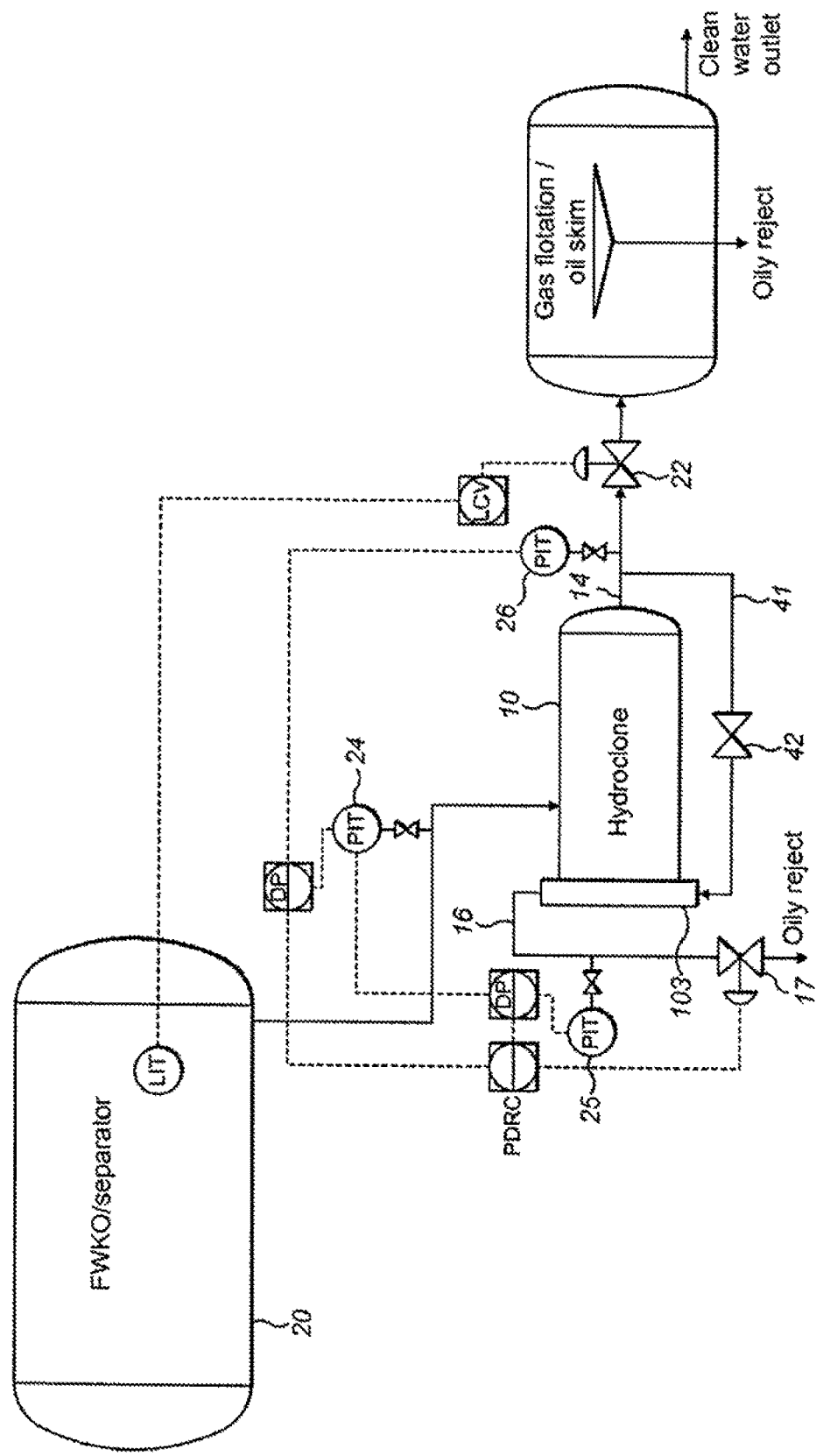

Examples of the present invention will now be described, by reference to the accompanying drawings, in which:
  FIG. 1 illustrates a cyclone separator;
  FIG. 2 illustrates a prior art fluid processing apparatus;
  FIGS. 3A and 3B illustrate how an array of separators can be constructed to form a separator device;
  FIG. 4 illustrates a fluid processing apparatus according to an embodiment of the present invention;
  FIG. 5 is a graph showing percentage reject flow versus pressure differential ratio for an ideal separator system;
  FIG. 6 is a graph showing the measured percentage reject flow versus pressure differential ratio for a separator system under actual operating conditions;
  FIG. 7 illustrates one approach to backwashing when required in a system according to the invention; and
  FIG. 8 illustrates a system according to the invention and constructed to improve backwashing when required according to the invention Referring to FIG. 1, a fluid treatment system 1 is shown comprising a de-oiling hydrocyclone separator 10, an inlet 12, a clean water outlet 14 and an oily waste outlet 16. The separator 10 is designed to separate oil from water by inducing a cyclone within the separator 10. The water outlet 14 and the oily waste outlet 16 are illustrated figuratively, with arrows indicating the direction of movement of fluid through these features, but the skilled person will appreciate that in practice they are implemented using physical pathways.

The position of fluid treatment system 1 comprising separator 10 within a known fluid processing apparatus 2 is shown in FIG. 2. In FIG. 2, the fluid processing apparatus 2 comprises an initial fluid store 20, which contains a mixture of oil and water. The fluid store 20 is coupled to the separator 10. In use, within a fluid processing apparatus 2, a mixture of untreated oil and water is passed from the fluid store 20 through connection 11 into the separator 10. This may optionally be done using pressure generated by a pump 40 although this depends on the pressure of the system. On entering the separator 10, the mixture is caused to rotate in the separation chamber, creating a cyclonic effect. As a result, the denser fluid is forced towards the edge of the separation chamber, while the less dense fluid is retained in the axial center of the separation chamber. As a result, the water and oil are separated and can be extracted from the clean water outlet 14 and the oily waste outlet 16 respectively.

After the mixture of oil and water that was initially held in the fluid store 20 leaves the separator 10, it is divided into two components that pass through the clean water outlet 14 and the oily waste outlet 16. Ideally, these components would be pure water and pure oil respectively. However, in practice there may be a mixture of fluids in each component. One reason for this is that the proportions of oil and water in the initial mixture must be reflected in the proportions of the total fluid which is extracted through the different outlets. For example, if the initial mixture contains only 20% oil, but the oily waste outlet 16 removes 50% of the fluid from the separator, it is clear that the component in the oily waste outlet 16 will contain some water.

The oily waste fluid that leaves the separator 10 through oily waste outlet 16 is either passed for further processing or may be returned to the fluid store 20 through a fluid connection 23. A control valve 22 is coupled to monitor the interface between water and oil phases of the mixture in fluid store 20. As such, the control valve 22 may be automatically opened or closed to allow clean water to leave from the fluid treatment system through outlet 14 according to the interface level of water and oil in fluid store 20. For example, if the interface level in the fluid store 20 is too low, level control valve 22 will close to reduce the amount of fluid leaving the fluid processing apparatus 2. It will be appreciated that the control valve 22 could be used to control other external process variables such as flow rate. It will be further appreciated that the valve 22 further operates to provide a back pressure on the separator 10 to force oily reject from the separator 10 and out through outlet 16.

Once fluid has passed through the level control valve 22 to leave the fluid processing apparatus 2, it reaches the downstream treatment 30 via outlet 14, in which one or more further steps of purification may be carried out, for example, to remove impurities from the water.

In FIGS. 3a and 3b there are shown schematic views of the construction of the separator device 10. Referring to FIG. 3a, the separator device 10 is formed from an array of individual separators 100 within a housing 105, each of which receive fluid to be treated from the inlet and then each of which feed oily reject fluid out to the outlet 16 via reject chamber 103 and treated fluid to the outlet 14 via chamber 104. Such a structure is formed to improve the efficiency of separation, but it will be appreciated that this results in the oily reject orifice 101 of each individual separator 100 within the separator device 10 having a very small diameter opening relative to the processed water outlets 102. This can result in blockage. As can be seen from FIG. 3b, in such a situation, where one reject orifice 101 is blocked, untreated water starts to pass through to the outlet 14. This reduces the quality of the treated fluid but is very difficult to detect as all the other separators 100 within the separator device 10 continue to operate normally. Over time more and more orifices 101 block, reducing significantly the treatment capability of the separator device 10.

A fluid processing apparatus 3 in accordance with an embodiment of the present invention is illustrated in FIG. 4. Components that correspond to those in the prior art configuration shown in FIG. 2 are numbered identically and will not be described again in detail. As with the prior art, the separator 10 device is a deoiling hydrocyclone and the first and second outlets of the separator device 10 are the clean water outlet 14 and oily waste outlet 16 respectively. Again the separator device is formed from an array of individual separators 100 within a housing 105.

With the present invention however pressure transmitters 24, 25 and 26 are provided at the inlet and outlet 16, 14 to provide to an operation control system 28 an indication of the operating pressures at each such that a pressure differential ratio according to the following formula:

$$PDR = \frac{P_{in} - P_{reject}}{P_{in} - P_{out}}$$

The control system 28 can then control the valve 17 at the waste outlet 16 to maintain a constant PDR. In addition however flow detectors (FITS) 31 and 32 are provided at the inlet of the separator device 10 and at the outlet 16 on the oily reject flow path. FIT 31 can be either on the reject as shown or on the clean water outlet. In another version FIT's can be on both the reject and clean water outlet to achieve the same calculation. The output from the flow detectors 31, 32 can also be fed back to the control device 28. By comparing the flow rate at the inlet and at the outlet 16 and by using the pressure differential ratio it is possible, either by use of a look-up table, or by mathematical processing, to provide an indication as to whether or not there is significant blockage in any individual reject orifice 101 within the separator device 10. Then a warning can be provided by the control system 28 to an operator to indicate that a cleaning process is required. Alternatively, an automated process can be initiated by the control system 28 to clear the blockages.

To understand more clearly the relationship between the measured PDR and the percentage of reject flow and how it can be used to detect blockages, it is worthwhile considering the relationship between percentage reject flow (i.e. the amount of flow going through reject outlet 16 compared to flow into the separator device 10) versus the PDR. An example relationship is shown in the graph of FIG. 5. This shows relationships for two hydrocyclones with identical geometry overflow reject orifices of 2.5 mm and 3.0 mm. As will be appreciated, the volume fraction and PDR terms are dimensionless, which means that the relationship shown in FIG. 5 would be constant for any number of hydrocyclones with identical geometry that operate in parallel. It will also be appreciated that a blockage in the reject orifice 101 of one hydrocyclone separator 100 in a parallel system is equivalent to a proportional blockage in the open area of the reject outlet of all the hydrocyclone separators 100 operating in parallel in the separator device 10.

For example, a hydrocyclone separator device 10 with ten individual hydrocyclones 100, each with a reject orifice of 3.0 mm will have a total reject orifice area of:

$$A_R = 10 \times \pi \left(\frac{3.0}{2}\right)^2 = 70.69 \text{ mm}^2$$

In a situation where three hydrocyclone reject orifices 101 become blocked then the remaining open area is:

$$A_R = (10 - 3) \times \pi \left(\frac{3.0}{2}\right)^2 = 49.48 \text{ mm}^2$$

The system with three blocked hydrocyclones will provide the same pressure transmitter readings on the transmitters 24, 25 and 26 and therefore the same PDR as an equivalent system with all ten hydrocyclones 100 with an equivalent reject orifice diameter of:

$$D = 2 \times \sqrt{\left(\frac{48.48}{10 \times \pi}\right)} = 2.51 \text{ mm}$$

From this an ideal curve of percentage reject flow versus PDR can be created for any de-oiling hydrocyclone geometry. This reference data can be stored by the control device 28, or the control device 28 can be provided with the necessary processing power to provide appropriate calculations to calculate this during operation.

By use of the flow detectors 31 and 32 it is possible to actually measure the percentage of reject flow during operation as well as the PDR during operation.

FIG. 6 shows where this has been done over time for a device with an orifice of 3.0 mm.

The data shows that all the hydrocyclones 100 within the separator device remained relatively clear during the first 30 minutes of operation. After this time the data points on the graph move away from the ideal curves showing that there is an accumulation of blockage of orifices. As is particularly notable, after a backwash occurs, the data points that are obtained come back to the ideal curve.

One approach to the processing required to detect a level that any blockage is such that either manual or automated cleaning of the system is required through backwashing is to model the ideal curve for a particular separator device 10 by using a quadratic equation and then calculating a difference between the ideal conditions and actual conditions. From this a value for the percentage of open area of the reject orifices 101 for a device 10 can be calculated.

$$\text{Actual Reject \%} = \frac{FIT_{Reject}}{FIT_{Inlet}}$$

Ideal Reject % = $a(PDR) + b(PDR) + c$

Where $a$, $b$ and $c$ are coefficients derived from hydraulic testing of the hydrocyclone $$\text{\% Open Area} = 100 \times \left(1 - \frac{(\text{Ideal Reject \%} - \text{Actual Reject \%})}{\text{Ideal Reject \%}}\right)$$

The percentage open area can then be monitored and when it falls below a certain threshold an indication can be provided by the control system 28 to an operator or an automated backwashing process can be initiated.

Referring to FIG. 7 one approach to backflushing is shown in which a backflush conduit 41 is provided with corresponding backflush valve 42. This conduit 41 and valve 42 are provided between the oily reject outlet 16 and the inlet for the separator device 10. Otherwise the configuration is that of FIG. 4, and the corresponding components are numbered identically.

In use, when it is determined that a backflush is necessary the reject control valve 17 is overridden and forced to close, with the backflush valve 42 then opening. This forces fluid from the inlet of the separator device 10 in to the oily reject line 16 to clear it. This then forces flow through the reject orifices (101) to reverse. Fluid is then passed through the separator device 10 to remove the contaminants either back to the storage unit 20 or out to further processing through the outlet 14, as required. While such an approach has benefits, there are also problems with it. For example, reversing the fluid flow in the reject line can re-introduce oily contaminants back into the reject chamber (103) and back through the oily reject orifices, causing filter blockage. Furthermore, in many separator device configurations the reject outlet 16 is not connected at the top of the separator device 10. Since oil and debris at the outlet 16 of the separator device 10 is less dense than water, the rejected oil and debris can accumulate in the top of the reject chamber 103 above the reject outlet pipe 16. Reverse flow then actually amplifies the potential to reverse block the individual orifices 101 during a backflush operation.

In an alternative backflush configuration as shown in FIG. 8 some of the problems of the configuration in FIG. 7 can be overcome. In this configuration, the backflush conduit 41 is connected directly to the reject chamber 103 of the separator device 10. Specifically, the backflush conduit 41 is connected at the bottom of the reject chamber 103 of the separator device 10. Furthermore, in this configuration the reject outlet 16 is configured to be positioned at the top of the reject chamber 103 of the separator device 10. This configuration has particular advantages because of the two separate connections to the reject chamber 103 of the separator device 10. The reject outlet line 16 connected at the top of the reject chamber 103 prevents floating oil and debris from collecting in the upper section of the reject chamber 103. The backflush conduit 41 connected at the bottom of the reject chamber 103 introduces cleaner backflush water directly into the reject chamber 103 instead of forcing contaminated water to backflow into the chamber from the reject outlet 16. In operation the backflush conduit 41 connects the separator device reject chamber 103 to the outlet 14 prior to its connection with the valve 22.

Again, such a system operates in the manner defined above with respect to the system of FIG. 4. However, when it is determined that a backflushing operation is necessary the backflush valve 42 is opened, immediately increasing the pressure in the reject chamber 103 of the separator device 10. The control valve 17 opens to try and maintain a constant PDR for the system. This equalises the pressure between the outlet 14 and the reject chamber 103 and ultimately drives the control device 28 to fully open the reject control valve 17. This then results in a large amount of the fluid passing from the outlet 14 to be diverted to the reject chamber 103 of the separator device 10 and the reject outlet line 16. The lower pressure in the outlet 14 will increase the total flow through the separator device 10, which will produce a lower pressure in the central core of each individual hydrocyclone 100.

This combination of reduced pressure in the outlet (14) and increased pressure in the reject chamber 103 of the separator device 10 causes a reversal of flow through the hydrocyclone reject orifices 101 which clears the blockage. At the same time, high flow of fluid through the reject chamber 103 of the separator device 10 and reject outlet 16 provides a much cleaner water for backflushing while at the same time serving to flush the outlet 16. An additional benefit of this arrangement is that the backflush valve 42 can be operated, either manually or automatically without overriding the rest of the control process associated with maintaining the PDR at the desired level. It also has the benefit that, when the backflush valve 42 is closed at the end of a backflush process the control system 28 regains its previous balance automatically because of its knowledge of a desired PDR set point. Of course, the backflush valve 42 can be configured to operate automatically when it is determined that a backflush is required in accordance with the operation described above in respect of the system of FIG. 4.

As will be appreciated from the above, the system of the present invention enables significantly improved operation of the separation system by the detection of blockage as and when it occurs, rather than relying on predetermined fixed intervals for cleaning of the system to remove any blockages. This improves the operating efficiency of the system as a whole and reduces the need for manual intervention to occasions when it is actually needed as well as also enabling the possibility of automated backwashing procedures which then reduce significantly the need for manual intervention at all.

The invention claimed is:

1. A fluid treatment system for separating a mixture of a first fluid and a second fluid, comprising:
a separator comprising a separating chamber, an inlet for receiving the mixture, a first outlet for discharge of the first fluid from the separating chamber and a second outlet for discharge of the second fluid from the separating chamber;
an inlet pressure transmitter, a first outlet pressure transmitter, and a second outlet pressure transmitter for monitoring the pressure at the inlet, first outlet and second outlet respectively and providing a signalling indicative of the pressures to a control device;
an inlet flow monitor for monitoring fluid flow rate at the inlet;
an outlet flow monitor for monitoring fluid flow rate at at least one of the first and the second outlets; and
a control device for receiving signals from the pressure transmitters and flow monitors and for processing those signals to provide an indication of blockage within the separator,
wherein the control device uses the signals from the inlet, first outlet, and second outlet pressure transmitters to compute a pressure differential ratio (PDR),
wherein the control device comprises a memory storing a relationship between percentage reject flow and PDR,
wherein the control device comprises processing means for performing calculations on the computed PDR to calculate a first percentage reject flow value based on the relationship between percentage reject flow and PDR, the first percentage reject flow value indicating operating conditions in the separator when there is no blockage,
wherein the control device uses the signals from the flow monitors to calculate a second percentage reject flow value based upon the flow into the inlet and the flow through the at least one of the first and the second outlets, the second percentage reject flow value indicating actual operating conditions within the separator,
wherein the control device is configured to compare the first percentage reject flow value to the second percentage reject flow value to provide the indication of blockage within the separator.

2. The fluid treatment system according to claim 1, wherein the separator is a cyclone separator.

3. The fluid treatment system according to claim 2, wherein the first fluid has a greater density than the second fluid, and wherein the outlet flow monitor is positioned on the second outlet.

4. The fluid treatment system according to claim 1, wherein the processing means is configured for performing calculations on the calculated first and second percentage reject flow values to provide an amount of blockage.

5. The fluid treatment system according to claim 1, further arranged to trigger an automated system backwashing process when a blockage is detected.

6. The fluid treatment system according to claim 1 further comprising:
a first control valve after the first outlet, the first control valve operating to control the flow of fluid leaving the fluid treatment system;
a second control valve after the second outlet, wherein the second control valve is operated by the control device to maintain a constant PDR; and
a fluid store, wherein the separator receives fluid from the fluid store.

7. The fluid treatment system according to claim 6, wherein the fluid store is an upstream pre-separator vessel.

8. The fluid treatment system according to claim 6, wherein the first control valve is coupled to the fluid store.

9. A method of treating a mixture of a first fluid and a second fluid, comprising:
providing a separator comprising a separating chamber, an inlet for receiving the mixture, a first outlet for discharge of the first fluid from the separating chamber and a second outlet for discharge of the second fluid from the separating chamber;
providing an inlet pressure transmitter, a first outlet pressure transmitter, and a second outlet pressure transmitter for monitoring the pressure at the inlet, first outlet and second outlet respectively and providing a signaling indicative of the pressures to a control device;
providing an inlet flow monitor for monitoring fluid flow rate at the inlet;
providing an outlet flow monitor for monitoring fluid flow rate at at least one of the first and the second outlets;
providing a control device for receiving signals from the pressure transmitters and flow monitors and for processing those signals to provide an indication of blockage within the separator;
receiving the mixture into the inlet of the separator;
separating the mixture of the first fluid and the second fluid in the separator;
discharging the first fluid through the first outlet of the separator;
discharging the second fluid through the second outlet of the separator;
monitoring the pressures in the inlet and first and second outlets of the separator;
monitoring the fluid flows at the inlet and at least one of the first and second outlets of the separator; and
determining a presence of a blockage in the separator depending upon the monitored pressures and flows,
wherein the monitored pressures in the inlet and first and second outlets of the separator are used in the control device to compute a pressure differential ratio (PDR), storing in a memory of the control device a relationship between percentage reject flow and PDR,
using processing means of the control device to perform calculations on the computed PDR to calculate a first percentage reject flow value based on the relationship between percentage reject flow and PDR the first percentage reject flow value indicating operating conditions in the separator when there is no blockage,
wherein the monitored fluid flows are used in the control device to compute a second percentage reject flow value, the second percentage reject flow value indicating actual operating conditions within the separator,
comparing the first and second percentage reject flow values to provide an indication of the blockage.

10. The fluid method according to claim 9, wherein the first fluid is water and the second fluid is oil.

11. The method according to claim 9, wherein the separator is a cyclone separator, wherein the first fluid has a greater density than the second fluid, wherein fluid flow is monitored on the second outlet, the method further comprising:
providing a first control valve after the first outlet;
operating the first control valve to control the flow of fluid leaving the fluid treatment system;

providing a second control valve after the second outlet; and operating the second control valve to maintain a constant PDR.

12. The method according to claim 11, further comprising performing calculations on the calculated first and second percentage reject flow values to provide an amount of blockage.

* * * * *